United States Patent [19]

Izumi

[11] 4,138,858
[45] Feb. 13, 1979

[54] COLD STORAGE APPARATUS

[76] Inventor: Masahiko Izumi, 8,26-ban, 5-chome, Hiikawa, Nishi-ku, Fukuoka-shi, Fukuoka-ken, Japan

[21] Appl. No.: 805,221

[22] Filed: Jun. 9, 1977

[30] Foreign Application Priority Data

Jun. 30, 1976 [JP] Japan .................................. 51-76462
Jun. 30, 1976 [JP] Japan .................................. 51-76463
Feb. 21, 1977 [JP] Japan .................................. 52-17219

[51] Int. Cl.² ............................................ F25D 17/04
[52] U.S. Cl. ...................................... 62/309; 62/451; 62/121
[58] Field of Search ............... 62/98, 121, 309, 96, 62/99, 332, 440, 451; 261/140 R, DIG. 3, DIG. 43; 55/235, 236, 237, 238

[56] References Cited

U.S. PATENT DOCUMENTS

| Re. 19,729 | 10/1935 | Garfield | 62/309 |
| 1,898,608 | 2/1933 | Alexander | 55/459 R |
| 2,049,352 | 6/1936 | Evans | 62/309 |
| 2,834,188 | 5/1958 | Bradford | 62/309 |
| 2,847,083 | 8/1958 | Hibshman | 55/236 |
| 2,959,025 | 11/1960 | Morrison | 62/451 |

Primary Examiner—Louis J. Casaregola
Attorney, Agent, or Firm—Browdy and Neimark

[57] ABSTRACT

A cold storage apparatus in which a gas in a cold storage chamber is fed to a cold water spraying cyclone to make low temperature, moisture rich gas and this gas is fed to a water droplet removing cyclone to remove water droplets and then the resultant low temperature moisture rich gas is allowed to circulate through the cold storage chamber.

This cold storage apparatus enables constant low temperature moisture rich cold storage at an optional temperature, and in which apparatus a stable storage of vegetables, fruits, meats and so on can be attained without producing frost and causing drying thereof.

10 Claims, 5 Drawing Figures

COLD STORAGE APPARATUS

OBJECT OF THE INVENTION

An object of the present invention is to provide a cold storage apparatus for allowing cold storage at a low temperature in a moisture rich condition absolutely without causing freezing.

Another object of the present invention is to provide a cold storage apparatus wherein perishables such as vegetables, fruits, meats and the like can be preserved for a long period at a temperature from 0.5° C. to 5° C. without causing drying thereof.

A further object of the present invention is to provide a refrigerator wherein biochemical products such as vaccines microbial products, srea and so on can be preserved for a long period at a temperature between 0.5° C. and 1° C. without causing any freezing thereof.

A further object of the present invention is to provide, such as in a grocery store, a cold storage apparatus wherein foodstuffs such as vegetables, meats etc. can be preserved for a long period without change of quality thereof while dust, infectious microbes and offensive smells, are controlled.

EXPLANATION OF THE INVENTION

The present invention relates to a cold storage apparatus wherein a gas, recycled from a cold storage chamber, is fed to a cold water spraying cyclone and cooled to a low temperature moisture rich gas in said cyclone, and then the resultant gas has water droplets removed therefrom in a water droplet removing cyclone after which the gas is then circulated to the cold storage chamber.

The cold storage apparatus of the present invention basically comprises a cold storage chamber, a cold water spraying cyclone, a water droplet removing cyclone and a circulating pipe.

The cold storage chamber may be constructed as a container, a room, a storage room or the like which has a cooling pipe surrounding it. The cooling pipe carries water or aqueous solution of a constant low temperature therethrough to cancel the effects of the temperature of the atmosphere, thereby making the cold storage apparatus of the present invention more complete. The cooling aqueous solution consists of water, salt water or potassium chloride solution etc., and these liquid are stored in a large capacity tank about at a temperature from −1° C. to 1° C. and always circulated to maintain the wall face of the cold storage chamber at a temperature of −1° C. to 1° C. thereby minimizing heat loss of the circulated gas.

The cold water spraying cyclone is provided with a cold water spraying mechanism in the cyclone through which the gas from the cold storage chamber is circulated, and while the gas dwells for a long period while it moves in a circular path through the cyclone, cold water is sprayed thereto thereby cooling it sufficiently and making a gas of rich moisture content at a desired temperature.

This cold water spraying cyclone may be provided with a cooling pipe wound around it and through said pipe water, salt water or potassium chloride solution etc. cold at a temperature of −1° C. to 0.5° C. is circulated thereby making cooling action more perfect. Moreover, if the cold water spraying cyclones are connected two or more, for example three, in series, gas of any high temperature can also be quickly converted to a moisture rich cooling gas of a temperature of −1° C. to 0.5° C., which is optimum for cold storage.

In this cooling spraying cyclone, gas is caused to move in a circular or helical path for a long period and sprayed with water, so that dust, infectious microbes and offensive smell in the cold storage chamber can be removed thereby producing a cleaned gas.

The water droplet removing cyclone has a conventional cyclone shape, in which the low temperature moisture rich gas obtained in the cold water spraying cyclone is fed and excess water droplets can be removed by centrifugal force during the passage therethrough of the gas.

The cold storage chamber, the cold water spraying cyclone and the water droplet removing cyclone are successively connected by a circulating pipe so that the gas is circulated through all of said means.

In the circulating pipe, a bypass pipe is provided which connects the outlet and the inlet of the cold storage chamber, namely connects a pipe extending between the cold storage chamber and cold water spraying cyclone with another pipe extending between the water droplet removing cyclone and the cold storage chamber, so that the quantity of gas to be fed to the cold storage chamber is adjusted and as well a constant quantity of gas is fed to the cold water spraying cyclone at a constant flow rate so as to maintain the operation of the cyclone consistent.

In the present invention, a large quantity of cooling water to be fed to the cold water spraying cyclone is required, and accordingly a storage tank therefor is provided, and water therein is coolded to a temperature near 0° C. by means of a freezing machine or ice. In the case of cooling by ice, such ice is made by an ice machine, and by contacting the resultant ice with water the water is cooled to a temperature of 0° C. to +0.5° C., but in the case using ice, the water approaches 0° C. automatically and it never becomes minus degree of temperature, so that any control mechanism is not required.

Gas for circulation in the cold storage apparatus of the present invention is selected from the group consisting of air, nitrogen gas and carbon dioxide gas etc., and a gas which is most suitable for the particular stored object is selected.

EXPLANATION OF THE DRAWINGS

Referring to FIG. 1, a cold storage chamber 1 has an infeed, cooling pipe 2 which is adapted to circulate, from a tank (not shown), water at a temperature of +5° C. therethrough to cool a wall face 3 of the cold storage chamber 1.

Figure 1:
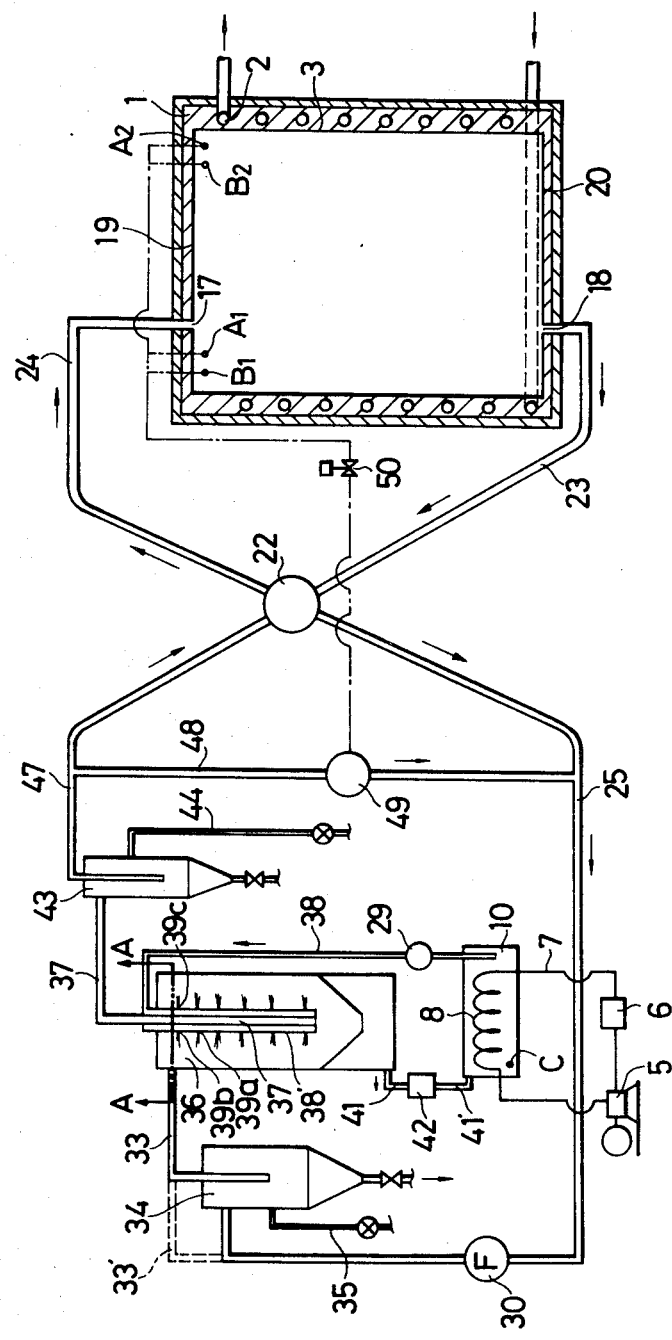
FIG. 1 is an explanatory view showing an embodiment of cold storage apparatus of the present invention.

A fan 30, drives, gas through the cold storage chamber 1 where it flows out through an outlet 18 provided at the bottom 20, through conduits 23 and 25 via a four-way change-over valve 22 into a dust arresting cyclone 34. The dust arresting cyclone 34 is provided with a steam pipe 35; in such cyclone 34 solid matter such as dust coming from the cold storage chamber 1 are separated and as required, steam is ejected from the steam pipe 35 to perform sterilization of air. However, for simplification, this dust arresting cyclone 34 can be omitted and then the gas can be directly passed through the conduit 33'. In this case, the steam pipe may be directly opened to said pipe 33' or to a cold water spraying cyclone 36. Removing of dust and offensive smell etc. is performed in the cold water spraying cyclone 36. The gas which has been removed of dust etc. by means of the dust arresting cyclone 34 is fed to the cold water spraying cyclone 36 through the conduit 33. The cold water spraying cyclone 36 has, on the side thereof, the conduit 33 communicating with the dust arresting cyclone 34. A conduit 37 passes through the upper portion of the cyclone 36 and to the interior thereof and around the conduit 37 extending into an cold water spraying cyclone 36 the extension portion of a cold water pipe 38 is attached as a double-pipe concentric pipe 38' which surrounds the pipe 37 and in which a plurality of spraying openings 39a, 39b . . . are formed. The cold water pipe 38 communicates with a cold water tank 10. A cooling medium compressor 5 of a cooling apparatus for cooling water, a condenser 6 for cooling medium gas coming from the compressor 5, and a conduit 7 connected to an evaporator 8 in the cold water tank 10 are provided for cooling the water. Water in the cold water tank 10 is always cooled at $+0.5°$ C. by means of the evaporator 8 and stored therein. In the drawings, the cold water tank 10 is shown in a small size, but practically it is made of a large capacity and a large quantity of cold water may be stored and then, cooling water can be preferably maintained at a low constant temperature. Cold water is ejected into the cold water spraying cyclone 36 through the spraying openings 39a, 39b . . . in the form of minute droplets by means of a pump 29. Air fed in the cold water spraying cyclone 36 contacts with water droplets from the ejecting pipes 39a, 39b . . . and causes heat-exchange therewith rapidly and efficiently, and an excess water content due to the cooling is condensation dehydrated, while moisture is added if the air is dry and thereby the air is saturated at a temperature approximately same as the cold water temperature and then passes through the conduit 37. On the other hand, the water taking calories also picks up any offensive smell, dust and infectious microbes etc. and these will then pass to the cold storage chamber in the form of a solution or suspension in the water so that it is unsuitable for repeated use, and therefore it is fed into a filter machine 42 via a conduit 41 to filter the water and then the filtered water is returned to the cold water tank 10 via a conduit 41'. For the purpose, this filter machine 42 is preferably composed of a usual filter machine having a filtering face made of a lamination of absorbing matters such as active carbon, diatomaceous earth, acid clay, ion-exchange resin and the like.

The cooled gas passing from the cold water spraying cyclone 36 is still accompanied by more or less spray and is wet, so that condensed water is then removed by an water droplet removing cyclone 43. Accordingly, only air which is removed of water droplets and is of a saturated humidity passes through the conduit 47 and through the conduit 24 via a four-way change-over valve 22 into the cold storage chamber 1 through an inlet 17 in the ceiling 19 thereof. Steam, dried gas and heated gas etc. may appropriately be fed as desired, to the cyclone 43 through a pipe 44, and thereby temperature and humidity may be regulated as required.

A bypass pipe 48 is provided between the conduit 25 of the fan 30 and the conduit 47 of the water droplet removing cyclone 43, and in this bypass pipe 48 an air flow rate controlling device 49 is provided.

On the other hand, within the cold storage chamber 1, detecting devices A1 and A2 for chamber temperature and detecting devices B1 and B2 for chamber humidity are provided, and an operating portion 50 for operating the air flow rate controlling device 49 in response to detected signals from these devices is provided, and thereby when change of chamber temperature occurs due to coming-in and-out of goods, the quantity of the bypassing gas is controlled by operation of the air flow rate controlling device 49 so that a large quantity of gas is fed temporarily to prevent the rise of temperature in the chamber.

Also, a temperature detecting device C for the cooling water tank 10 is electrically connected to the compressor 5, and the temperature detecting devices A1, and A2 are electrically connected to a power source (not shown) of the fan 30.

The four-way change-over valve 22 reverses the gas transfer lines when rotated through 90° with the result that air can be fed from the outlet 18 in the bottom 20 and discharged from the inlet 17 in the ceiling 19.

Figure 2:
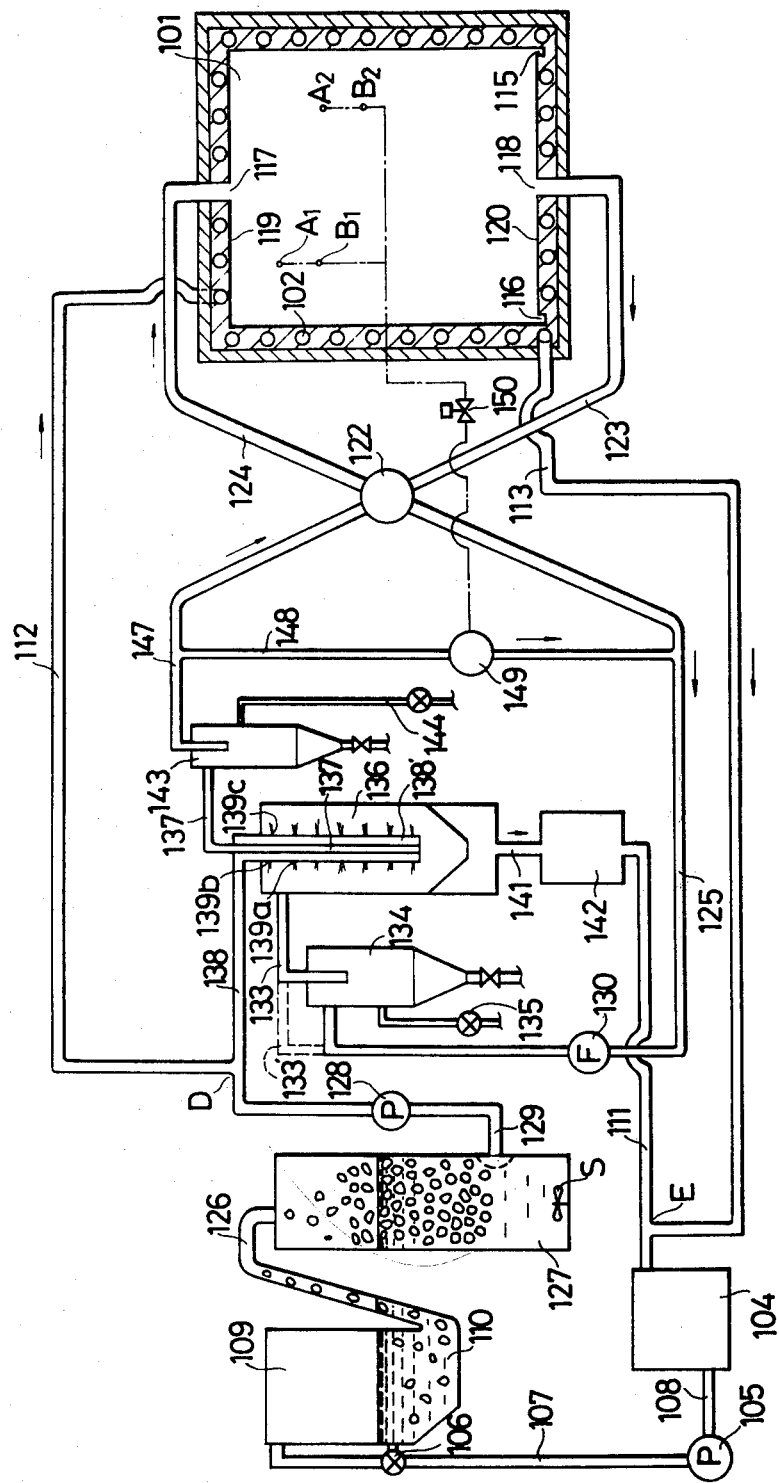
FIG. 2 is an explanatory view showing another embodiment of cold storage apparatus of the present invention.

FIG. 2 illustrates another embodiment of the present invention, and hereinafter this will be explained.

101 is a cold storage chamber and 102 is a cooling pipe which circulates water of $+0.5°$ C. fed from a cold water tank 127 through a pump 128 and cools the wall face 103. 115 and 126 are drain discharge grooves.

130 is a fan and when operating this fan, air in the cold storage chamber 1 passes through an outlet 118 provided in the bottom 120 and through a conduit 123 and conduit 125 via a four-way change-over valve 122 and into a dust arresting cyclone 134. For simplification, the cyclone 134 may be omitted and the gas may be passed through a conduit 133'. The air is then fed to a cold water spraying cyclone 136 through a conduit 133.

The cold water spraying cyclone 136 has the conduit 133 opening on the side thereof, which communicates with the dust arresting cyclone 134. A conduit 137 extends downwardly into the cyclone 134, and around the extended conduit is provided the extension portion of a cold water pipe 138 as a double-pipe 138', and the double-pipe 138' has a number of spraying openings 139a, 139b, 139c . . . opened therein.

The cold water pipe 138 communicates with an ice water tank 127 through a pump 128 and a pipe 129. Within the ice water tank 127 there is always stored a large quantity of cold water cooled to near 0° C. by ice, and the interior thereof is stirred by means of a screw S to make the temperature uniform. This cold water is sprayed out through the spraying openings 139a, 139b. . . to cool the air and make it moisture rich.

The water taking up calorie has also an offensive smell, minute dust etc. from the interior of the cold storage chamber 1 in solution or suspension therein so that it is unsuitable for repeated use, and therefore it is fed to a filter machine 142 through a conduit 141 to filter it and thereafter is returned to a cold water tank 104 through a conduit 111. To attain this end, the filter machine 142 is preferably of a conventional filter machine in which there is provided a filter face composed of the lamination of absorption matters such as active carbon, diatomaceous earth, acid clay, ion-exchange resin and the like.

The cooled air leaving the cold water spraying cyclone 136 still contains more or less spray therein and thereby is wet, so that it is conditioned by means of a water droplet removing cyclone 143. Accordingly, only air which has been removed of water droplets and is at a saturated humidity is fed in through a conduit 147 via a four-way change-over valve 122, through a conduit 124 and through an inlet 117 provided at the ceiling 119 of the cold storage chamber 101. 144 is an air pipe through which steam and dried air etc. are fed as required.

148 is a bypass pipe which is operated to open and close by means of an air flow rate controlling device 149 so as to adjust the quantity of air flow to the cold storage chamber 101. There are provided detecting devices A1 and A2 for temperature and detecting devices B1 and B2 for humidity in the cold storage chamber 101, and also there is provided an operating portion 150 for operating the air flow rate controlling device 149 in response to detected signals by said devices, and thus when the chamber temperature changes due to opening and closing of the door and the like the operation of the air flow rate controlling device 149 causes the controlling of the quantity of bypass to the conduit 125 of the conduit 147 so that a large quantity of air having an adjusted temperature and humidity is caused to circulate temporarily thereby effecting controlling of temperature and humidity in the chamber.

Cold water subjected to heat-exchange with the air in the cold water spraying cyclone 136 is passed into the cold water tank 104 through a pipe 141, a filter 142 and a conduit 111. The cold water is fed from the cold water tank 104 through the pipes 108 and 107 into an ice machine 109 and an ice-water mixing chamber 110 by means of a pump 105. In this case, the flowing direction may be controlled by a valve 106 to any one of the ice machine 109 and the ice-water mixing chamber 110. Ice-water in the ice-water mixing chamber 110 is fed into the ice-water tank 127 through a pipe 126 together with cold water fed in by the pump 105.

In the ice-water tank 127, ice is usually in the state wherein it is floating in water, and the pipe 129 is attached at a point of the boundary between ice and water and thus the water is fed to the pipe 138 from the pipe 129 by a pump 128. The pipe 138 is communicated with the cold water spraying cyclone 136.

Also, cold water is fed to the conduit 112 at a point D when fed by the pump 128 and thereby fed to the cooling pipe 102 of the cold storage chamber 101 where the cold water is circulated to cool the wall face 103 and then is fed out of the cooling pipe through the conduit 113 and joins with the water of the conduit 111 at a point E and then is recovered into the cold water tank 104 and thereafter continues the circulation repeatedly.

Figure 3:
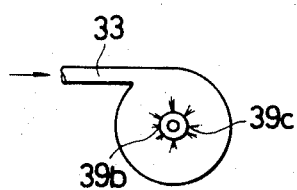
FIG. 3 is a sectional plan view taken along the line A—A of a cold water spraying cyclone 36 of FIG. 1.
Figure 4:
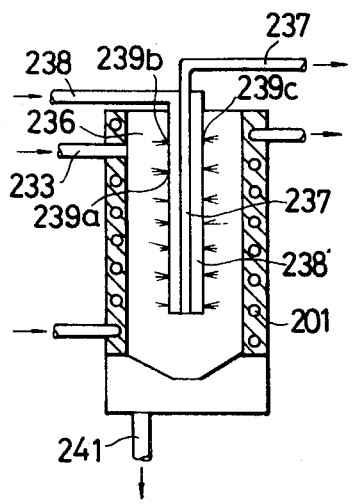
FIG. 4 is a longitudinal sectional view of another embodiment of the cold water spraying cyclone.

FIG. 3 is a sectional plan view of the cold water spraying cyclone of FIG. 1 taken along the line A—A, wherein 33 is a conduit and 39b, 39c . . . are spraying openings for cold water. Also, FIG. 4 is a longitudinal sectional view of a cold water spraying cyclone of the present invention, wherein 233 is a conduit, and 238 is a cold water pipe which extends into a spraying cyclone 236 thereby forming a cold water pipe 238'. 237 is a conduit which is surrounded by a cold water pipe 238' in the form of double-pipe. Spraying openings 239a, 239b, 239c . . . are provided in the cold water pipe 238', through which cold water is sprayed out. Also, on the periphery of this cold water spraying cyclone a cooling pipe 201 is wound, through which water, salt water, calcium chloride or potassium chloride solution etc. may be circulated. Due to this, the gas in the cold water spraying cyclone can be cooled approximately to a temperature of 0° C. to −1° C., and when fed into the cold storage chamber, it does not cause sudden rise of temperature thereby permitting sufficient cold storage effect.

Figure 5:
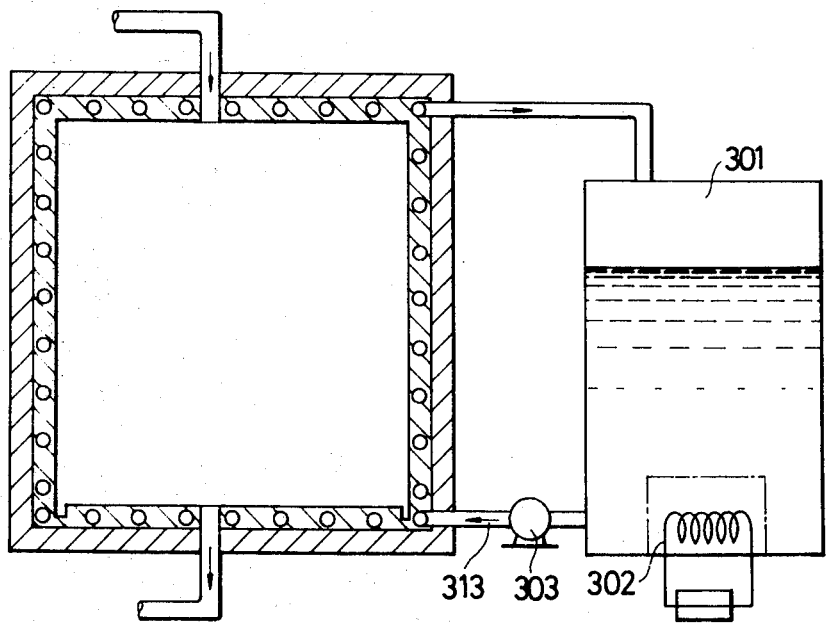
FIG. 5 is an explanatory longitudinal sectional view of a further embodiment of cold storage chamber and cooling water storage tank.

FIG. 5 is an explanatory view of another embodiment, wherein cooling of the cold storage chamber is performed in another way. 301 is a large capacity tank in which water, salt water or calcium chloride solution etc. is stored in large quantities and it is cooled by an evaporator 302 of a freezing machine thereby always cooling them approximately at a temperature of −1° C. to 1° C., and it is caused to circulate in the cooling pipe of the cold storage chamber through a conduit 313 by means of a pump 303.

What is claimed is:

1. A cold storage apparatus comprising a cold storage chamber, a cold water spraying cyclone through which cooling gas is circulated and in which cold water is sprayed to said gas to cool said gas and increase its moisture content, a water droplet removing cyclone in which the low temperature moisture rich gas obtained in said cold water spraying cyclone is freed of water droplets, and a circulation pipe to feed the gas from said cold storage chamber to said cold water spraying cyclone, to the water droplet removing cyclone therefrom and then to the cold storage chamber from said water droplet removing cyclone.

2. A cold storage apparatus as claimed in claim 1 including a bypass pipe which is provided, in the circulation pipe, between a point between the cold storage chamber and the cold water spraying cyclone and another point between the water droplet removing cyclone and the cold storage chamber, and means to control the amount of gas flowing through said bypass pipe.

3. A cold storage apparatus as claimed in claim 1, wherein at least two cold water spraying cyclones are successively arranged in series.

4. A cold storage apparatus as claimed in claim 1, wherein a dust arresting cyclone is provided before the cold water spraying cyclone.

5. A cold storage apparatus as claimed in claim 1, further comprising a water storage tank for the cold water to be sprayed in the cold water spraying cyclone, means to cool said water and means to collect the circulate the water from the spraying to and through said tank.

6. A cold storage apparatus as claimed in claim 1, further comprising a water storage tank for the cold water to be sprayed in the cold water spraying cyclone, an ice machine, means to cool said water by contact with ice from said ice machine and means to circulate the water from the spraying to and through said tank.

7. A cold storage apparatus as claimed in claim 1, further comprising a cooling pipe around the periphery of said cold storage chamber and means to circulate cooling water solution from a cooling water solution storing tank through said cooling pipe.

8. A cold storage apparatus as claimed in claim 1, wherein the circulating gas is one selected from the group consisting of air, nitrogen gas and carbon dioxide gas.

9. A cold storage apparatus, comprising: a cold storage chamber; a cold water spraying cyclone through which cooling gas is circulated and in which cold water is sprayed to said gas to cool said gas and increase its moisture content; a cooling pipe wound about the periphery of said cold water spraying cyclone; means to circulate cooling liquid through said cooling pipe wound about the periphery of said cold water spraying cyclone to cool said cold water spraying cyclone; a water droplet removing cyclone in which the low temperature moisture rich gas obtained in said cold water spraying cyclone is freed of water droplets; and a circulation pipe which is adapted to feed the gas from said cold storage chamber to said cold water spraying cyclone, to the water droplet removing cyclone therefrom and then to the cold storage chamber from said water droplet removing cyclone.

10. A cold storage apparatus in accordance with claim 1, wherein said cold water spraying cyclone comprises an upwardly extending air exit pipe located along the axis of said cyclone and terminating at its bottom end within said cyclone, and a cold water inlet pipe coaxial with said air exit pipe and having water outlet openings therein.

* * * * *